(12) United States Patent
Keany et al.

(10) Patent No.: US 8,010,965 B2
(45) Date of Patent: Aug. 30, 2011

(54) AUTOMATIC TASK PERFORMANCE AS SCHEDULED USING EMBEDDED SECONDARY PROCESSOR

(75) Inventors: Bernard Keany, Lake Oswego, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1399 days.

(21) Appl. No.: 11/469,368

(22) Filed: Aug. 31, 2006

(65) Prior Publication Data

US 2008/0059275 A1 Mar. 6, 2008

(51) Int. Cl.
*G06F 9/46* (2006.01)
*G06F 1/00* (2006.01)
*G06F 11/00* (2006.01)
*G06F 15/16* (2006.01)

(52) U.S. Cl. ............. 718/102; 713/300; 714/1; 709/208
(58) Field of Classification Search ................ 718/102; 713/300; 714/1; 709/208
See application file for complete search history.

(56) References Cited

U.S. PATENT DOCUMENTS

| 6,003,065 | A  | * | 12/1999 | Yan et al. ....................... 709/201 |
| 7,287,147 | B1 | * | 10/2007 | Hudepohl et al. ............... 712/34 |
| 2004/0221285 | A1 | * | 11/2004 | Donovan et al. .................. 718/1 |
| 2005/0010733 | A1 | * | 1/2005 | Mimatsu et al. .............. 711/162 |

* cited by examiner

*Primary Examiner* — Meng An
*Assistant Examiner* — Blake Kumabe
(74) *Attorney, Agent, or Firm* — Schwabe, Williamson & Wyatt, P.C.

(57) ABSTRACT

A system, apparatus and method to receive, schedule, and perform a task automatically on a multi-processor device are described herein. In various embodiments, the multi-processor device is a member of a home network environment.

21 Claims, 6 Drawing Sheets

AUTOMATIC TASK PERFORMANCE AS SCHEDULED USING EMBEDDED SECONDARY PROCESSOR

TECHNICAL FIELD

Embodiments of the present invention relate to the fields of data processing, storage, and communication. More particularly, various embodiments relate to techniques for automated task initiation, including the use of embedded secondary processors.

BACKGROUND

Advances in computing and related technologies have led to increase sophistication in application of these technologies. In particular, in many applications, a variety of tasks are to be performed automatically. At the same time, for energy consumption and other reasons, increasingly more and more devices operate in reduced power or partially off state, presenting problems for automated task performance.

For example, home networks connecting more than one home network device are becoming increasingly popular fueled by many factors including the growth of broadband internet usage and the proliferation of digital media. As a result, many consumers enjoy movie and television watching, hi-fi listening, recording and dubbing using various devices attached to the home network. A great number of home networks have non-conventional network devices, such as Consumer Electronic (CE) devices that also have the ability receive and store digital media.

The growth in the number of these home network devices poses challenges of managing and protecting irreplaceable personal data and digital media, such as digital photographs, personal digital videos and other personal multimedia content. Moreover, each home network device attached to the home network may generate personalized multimedia content such as music, recorded television shows, and downloaded videos to be managed.

At the same time, there has also been a growing awareness of relative energy consumption of all the various electronic devices associated with the home network. In addition to the more traditional consumer initiated shutdown mechanisms on personal computers (PCs), the industry has also developed several modes of reducing the energy consumed by these devices through either standby or hibernation modes when the devices are not actively being used. As a result, a device in a power conservation state may not be available at a given time or may require additional time to transition to a more active state for tasks to be automatically performed.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Various embodiments, described below, have been developed in response to the current state of the art and, in particular, in response to the previously identified problems and factors of automated task performance, and the related data processing, storage, and communication difficulties that have not been fully or completely solved by currently available systems, e.g. home network systems and associated communication protocols for home network devices. Embodiments provide a method for an embedded secondary processor of a platform to receive information associated with a task to be automatically performed, including scheduling information associated with when the task is to be automatically performed. The embedded secondary processor either performs the task or, if the task is to be performed by a primary host processor of the platform, the embedded secondary processor ensures that the primary host processor is in a requisite operational state to perform the task automatically according to schedule. In at least one embodiment, the system, via secondary embedded processors, reduces overall energy consumption of the system by not requiring participating devices and associated resources to be "always on" and further coordinates management of the devices of the system, thereby increasing the reliability of the system. In one embodiment, one of the automated tasks includes automated backup of distributed content to increase consistency of data storage, using an embedded secondary processor on a platform within a digital home network. In this manner the embedded secondary processor of the platform can manage and/or protect irreplaceable personal data, personal digital media, and/or other personalized multimedia content of the digital home network. While this disclosure and drawings refer to a digital home network, one of the automated tasks as a backup function, other embodiments considered with the scope of the claims perform tasks which can be scheduled and run without operator intervention and/or may bring portions of a host platform out of an energy conserving state. Exemplary tasks to be automatically performed as scheduled include scanning for malware, optimizing system resources, updating software and firmware, recording multimedia data, managing digital licenses, validating network identification information, configuring network resources, restoring data, streaming data, downloading requested data, monitoring email and calendar data, managing shared network resources and other similar administrative tasks.

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Reference in the specification to a home network "digital device" and/or "appliance" means that a particular feature, structure, or characteristic, namely device operable connectivity, such as the ability for the device to be connected to communicate across the home network, and/or programmability, such as the ability for the device to be configured to perform designated functions, is included in at least one embodiment of the digital device as used herein. Typically, digital devices may include general and/or special purpose computing devices, such as a laptop computer, a personal digital assistant (PDA), mobile phone, and/or console suitably configured for practicing the present invention in accordance with at least one embodiment. The terms "client" and "host" device/platform are often synonymously used herein and are interchangeable with digital device as previously defined. Reference in the specification to "remote device" means a network device electronically coupled, via a network interface, to the digital device and/or host platform and suitably configured for practicing the present invention in accordance with at least one embodiment. Exemplary remote network devices may include general and/or special purpose computing devices, such as a network mass storage device, a home network access policy decision point (PDP), a home network Policy Enforcement Point (PEP), a gateway, a router, a bridge, a switch, a hub, a repeater, other home network digital devices, and/or a home network server.

Figure 1:
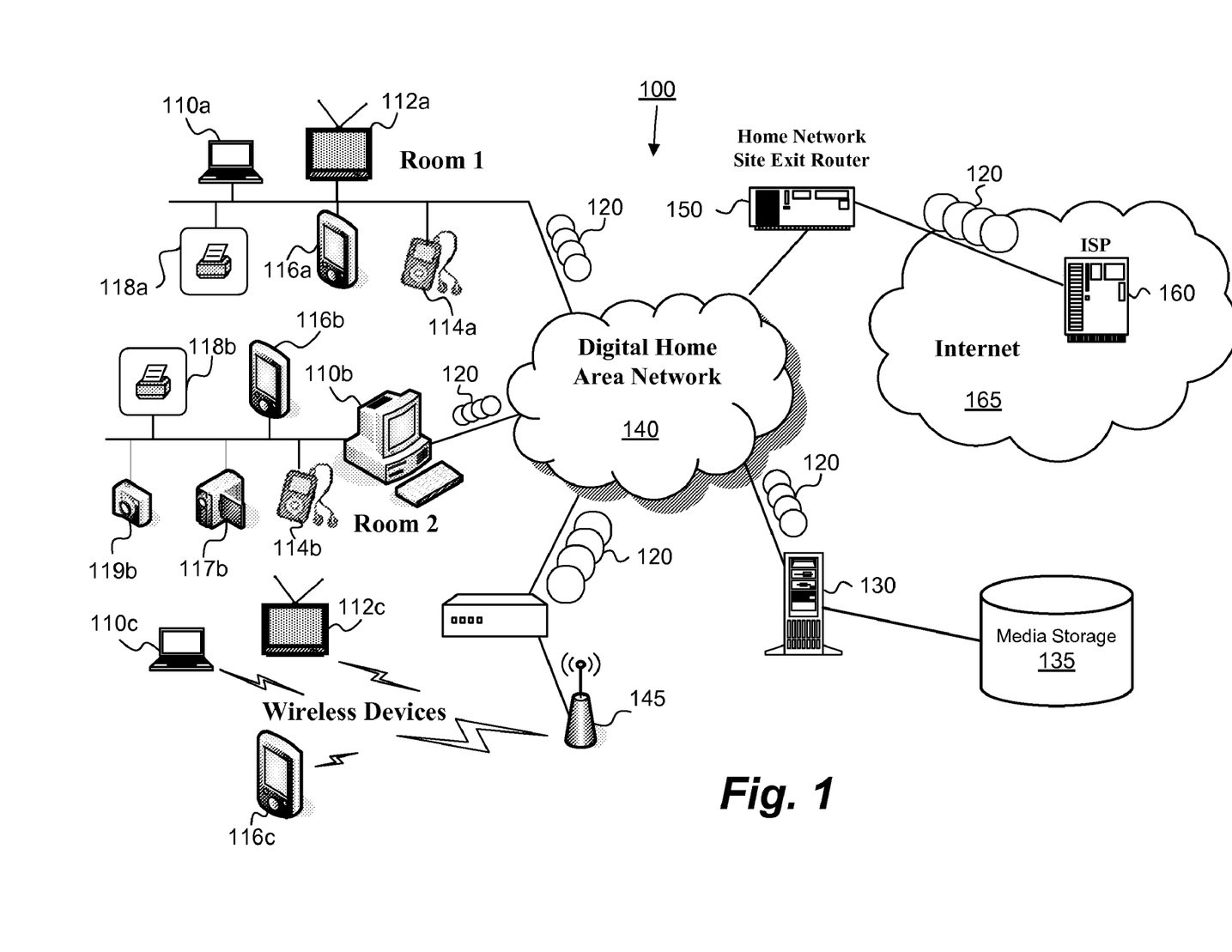
FIG. 1 illustrates a block diagram of an exemplary digital home network environment coupled with different home network devices, including a host platform, in accordance with at least one embodiment.

Referring now to FIG. 1, a block diagram of an exemplary home network connecting more than one home network device is illustrated. Specifically, a host platform 110a, 110b or 10c is coupled to a variety of different remote home network devices (e.g., 112-170) via a digital home network 100. The digital home network 100 transmits data 120 to a variety of network resources including a network server 130 and media storage device 135 across a local routing system or digital home area network 140, which may also include wireless routing 145. The digital home network 100 may also connect via a home network site exit (aka gateway) router 150 to an Internet Service Provider (ISP) 170. The ISP 170 provides the home network devices with access to the Internet 170, a worldwide, publicly accessible network of interconnected computer networks that transmit data by packet switching using standard communication protocols.

The network connections of the various network capable devices may be direct connections as illustrated by the host platform 110a, media center 112a, personal multimedia device 114a, personal digital assistant 116a, and printer 118a in Room 1 or indirect connections using another network capable device as illustrated in Room 2 by the host platform 110b connecting the personal multimedia device 114b, personal digital assistant 116b, the video camera 117b, the printer 118b, and the camera 118b to the home network 100.

The digital home network 100 may include both wired and wireless connections to the different home network devices (110-119).

For illustrative purpose, home networks 100 have a number of tasks to be automatically performed. For example, home networks 100 are often more susceptible to loss of data following system crashes as a result of various malware mechanisms (e.g., worms, viruses, Trojan horses, rootkits) which often propagate into networks. Unlike data derived from more traditional multimedia stored on optical disc storage (e.g., CD, DVD), magnetic storage (e.g., VHS, Cassette, disks), analog storage (e.g., phonograph records), and other similar storage mediums, data from digital media sources may not have a readily available back-up source. More specifically, much of the digital media stored on a home network 100 contains irreplaceable personal data and digital media, such as digital photographs, personal digital videos and other personal multimedia content which cannot be recreated.

Figure 2:
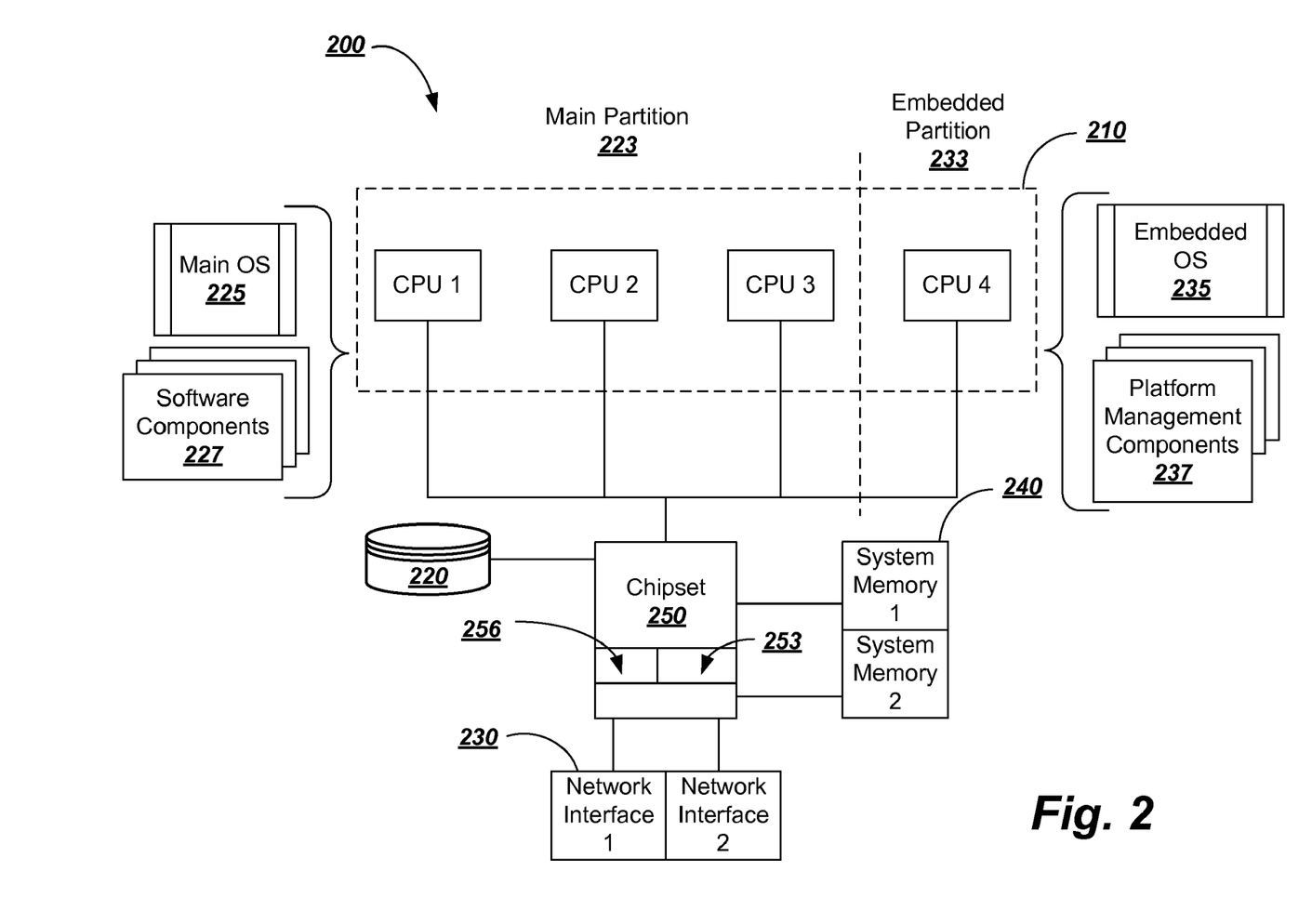
FIG. 2 illustrates a multi-processor platform system in a digital home network as presented in FIG. 1 in further detail, in accordance with various embodiments.

In accordance with one embodiment, digital devices or appliances incorporating the multiprocessor host platform system described in greater detail in FIG. 2 can be configured to perform the task of automatically backing-up valuable multimedia to the media storage device 135 to store all the distributed digital content retrieved from the home network devices into a centralized network attached storage (NAS) and the like. Although illustrated as a component of the network server 130, the media storage device 135 may also be an independent remote network device or attached to another host platform.

In this manner, the remote home network devices on the digital home network 100 could each be individually turned off or powered down before the task to automatically backup data is initiated by the host platform and/or home network server. The task to automatically backup data may be adapted to store all the distributed digital content on the digital home network into a centralized NAS.

In another embodiment, the embedded partition of the host platform generates Wake-on-LAN (WoL) messages on the digital home network 140, retrieves the distributed digital content, and backs-up the retrieved content onto a centralized storage device. In this embodiment, the host platform would not need any help from the main partition, so the main partition could be turned off or placed in a power conservation operational state while the backup operations are being performed by the embedded partition.

Referring to FIG. 2, a block diagram of a multi-processor host platform system 200 is shown in accordance with various embodiments. The system 200 includes a plurality of processors 210, a mass storage device 220, a network interface 230, memory 240, and a chipset 250, coupled to each other as shown.

In one embodiment, the network interface 230 is configured to receive information associated with a task to be automatically performed by either an embedded secondary processor of partition 233 or a primary host processor of the main partition 223. The received task information including scheduling information associated with when the task is to be automatically performed by the multi-processor host platform system 200.

In one embodiment, the network interface 230 includes at least a first and a second network interface, each network interface dedicated to one partition of the host system 200. Similar allocation to a specific partition may be made for system memory 240 and platform management components (227 and 237). In this manner, resources associated with respective partitions can either enter standby or hibernation modes when the devices are not actively being used, using various shutdown mechanisms. Moreover, in case of network infection by a malware mechanism, resources from infected partitions may be effectively isolated from resources in uninfected partitions.

Accordingly, if the task is to be performed by the embedded secondary processor, the embedded secondary processor performs the task automatically as scheduled. On the other hand, if the task is to be performed by the primary host processor, the embedded secondary processor ensures that the primary host processor is in a requisite state to perform the task automatically on schedule. When the main partition 223 is in a power conservation state and the primary host processor is to perform the task, the secondary embedded processor may initiate a return of the resources associated with the main partition 223 to a properly powered state to enable performance ensuring completion of the task. In one embodiment, a partial power state, activating only the components associated with the task, is sufficient. Alternatively, depending on the task, the system may require the main partition to return to a full power state to activate all the components associated with the partition.

In one embodiment, the use of processors and platform management components 237 associated with the embedded partition 233 allow the system to be brought back from a low power state and/or no power state prior to scheduled times for automated tasks. Prior to entering a power conservation state the main partition 223 stores in memory 240, such as non-volatile RAM (NVRAM), the desired time (e.g., at 2 A.M. or in 4 hours or after all applications are closed) that the embedded partition 233 should either perform the task or make sure that at least one of the primary host processors is in a requisite operational state, such as a full power state, to perform the task (e.g., back-up procedure or virus scan). In one embodiment, the embedded partition may bring at least one of the primary host processors and corresponding main operating system to a requisite operational state so that the scheduled applications can run on the restored primary host processor.

The plurality of processors 210 are the primary resources allocated to the respective partitions and may include any variety of processors known in the art including, in one embodiment, processors having a plurality of processing cores, for example, an Intel® Pentium® D processors, Intel® Core™ 2 Extreme, and Intel® Core™ 2 Duo. The plurality of processors 210 may comprise an integrated circuit (IC), such as a semiconductor integrated circuit chip. In the embodiment illustrated in FIG. 2, the plurality of processors 210 may include a plurality of central processing units (CPUs), for example, CPU1, CPU2, CPU3, and CPU4. Additional or fewer processors may be used in various embodiments. The plurality of processors 210 may be logically and/or physically divided into a plurality of partitions. For example, in the illustrated embodiment, the plurality of processors 210 are selectively assigned to one of two partitions, a main partition 223 (CPU1, CPU2, CPU3) or an embedded partition 233 (CPU4). In one embodiment, the plurality of processors 210 have at least one first processing core (CPU1, CPU2, CPU3) coupled, via chipset 250, with the network interface 230 and the mass storage device 220.

Although the assignment of the processors 210 to a particular partition may be temporary, a subsequent reassignment of the processing core may necessitate a suitable isolation, authentication, and/or validation to maintain independence of the embedded partition from the operating system 225. For example, a processor may be reassigned through a sequestering process on device start-up prior to activation of the operating system. Alternatively, in one embodiment, the various processors 210 may be dedicated and/or permanently assigned to one of the available partitions.

The at least one primary host processor associated with the main partition 223 is adapted to execute the one or more software components 227 and the operating system 225 which may include, for example, a general operating system such as Windows® operating systems, Linux, etc. The at least one processor associated with the embedded partition 233 is adapted to execute the one or more platform recovery management components 237 to determine information associated with a task to be automatically performed by either the embedded secondary processor independent of the main operating system 225 or a primary host processor of the device using the main operating system 225.

In one embodiment, the at least one processor associated with the embedded partition 233 is further adapted to execute an embedded operating system 235. The embedded operating system 235 may include, for example, BSD variants (OpenBSD, NetBSD, FreeBSD), Linux, Windows CE®, and/or other operating systems, such as a Real-Time operating system (VxWorks, ThreadX, RTLinux), or even an OS-absent operational environment (e.g., EFI). As will be described in greater detail below, in various embodiments, the embedded operating system 235 may be capable of controlling the operation of one or more mass storage devices 220 and/or network interfaces 230 coupled to the chipset 250 in conjunction with the task to be automatically performed.

The one or more platform management components 237 of the embedded partition 233 are adapted to transmit stored platform data to a remote device via at least one of the network interfaces 230. In one embodiment, the remote device includes a server and remote media storage repository that includes task information with scheduling information associated with when the task is to be automatically performed, desired start-up time, drive locations, and/or Wake-on-LAN (WoL) information for the other home network devices. Accordingly, in one embodiment, the one or more platform management components 237 of the embedded partition 233 are further adapted to receive task information from the remote device. In addition to being optionally coupled to a second network interface 230, the embedded partition 233 may also be coupled to a dedicated portion of memory 240 configured to store the information associated with the task to be automatically performed by either the embedded secondary processor or a primary host processor of the multi-processor host platform system 200.

System memory 240 may include semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 240 may comprise other and/or later-developed types of computer-readable memory. Machine-readable firmware program instructions may be stored in memory 240. As described below, these instructions may be accessed and executed by the main partition 223 and/or the embedded partition 233 of host processor 210. In this embodiment, memory 240 may be logically and/or physically partitioned into system memory 1 and system memory 2. System memory 1 may be capable of storing commands, instructions, and/or data for operation of the main partition 223 and system memory 2 may be capable of storing commands, instructions, and/or data for operation of the embedded partition 233.

Chipset 250 may include integrated circuit chips, such as integrated circuit chipsets manufactured and/or sold by different vendors, such as Intel® (e.g., graphics memory and I/O controller hub chipsets), although other integrated circuit chips may also or alternatively be used. Chipset 250 may also include inter-partition bridge circuitry 256. "Circuitry", as used in any embodiment herein, may comprise, for example, singly or in any combination, hardwired circuitry, programmable circuitry, state machine circuitry, and/or firmware that stores instructions executed by programmable circuitry. The inter-partition bridge circuitry 256 may be capable of providing communication between the main partition 223 and the embedded partition 233. Chipset 250 may also be coupled to a plurality of mass storage systems 220.

In one embodiment, embedded partition 233 may be capable of controlling the chipset 250 to exchange commands and/or data with one or more platform system 200 resources coupled to chipset 250 using at least one of a plurality of communication protocols. The embedded partition 233 may also be capable of gathering task information related to the resources coupled to the chipset 250. Embedded partition 233 may also be capable of mapping two or more remote resources into a logical device 253. To that end, embedded partition 233 may be capable of generating a map that correlates logical block address (LBA) information of the logical device 253. The logical device 253 may include, for example, a single large extended device (SLED). In one embodiment, the logical device 253 may be stored in association with the inter-partition bridge circuitry 256 so that the main partition 223, during task performance, can access the logical device 253.

Figure 3:
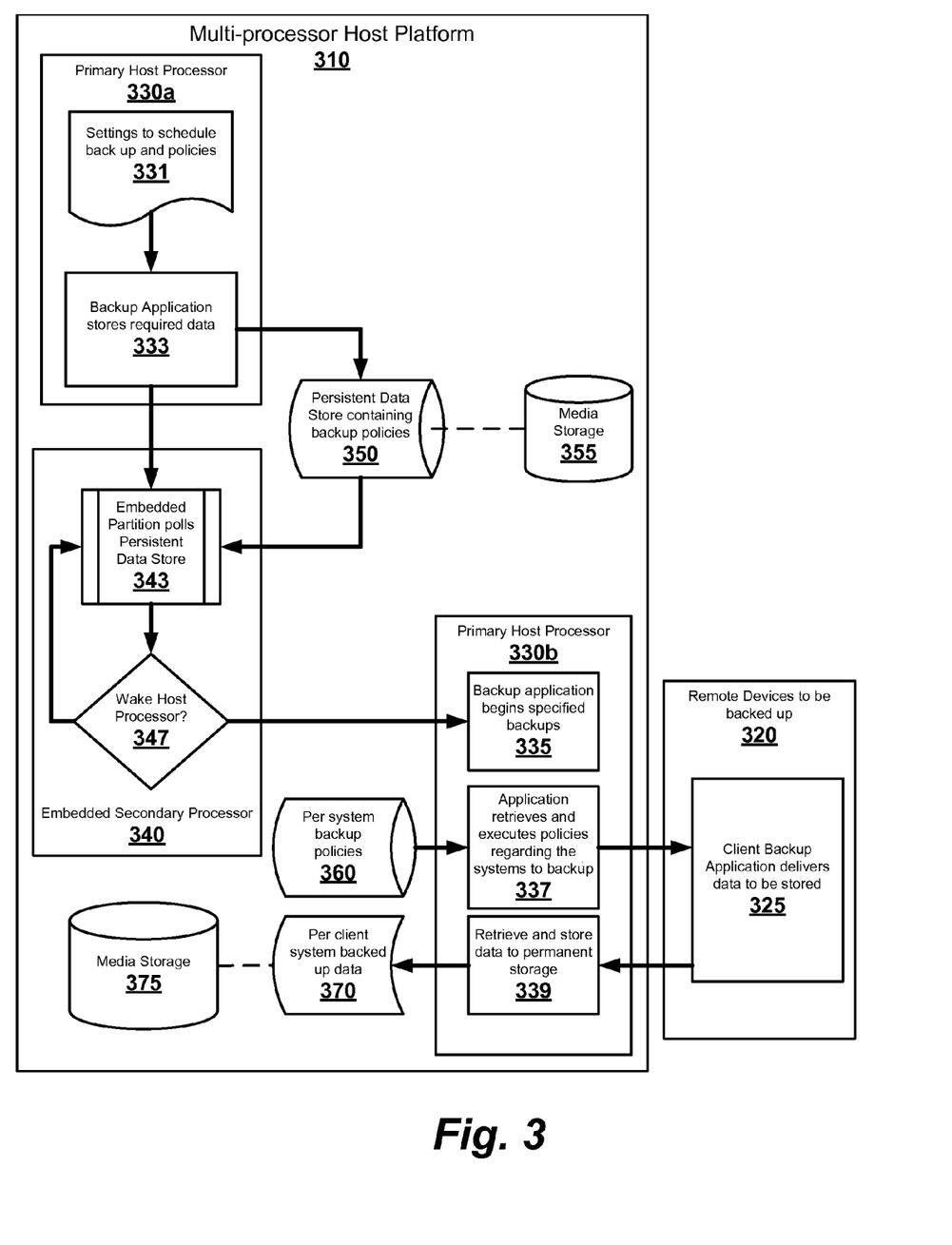
FIG. 3 illustrates a multi-processor platform system in a digital home network as presented in FIG. 2 in further detail, in accordance with various embodiments.

Referring to FIG. 3, an example application of embedded secondary processor automated task performance technology to managing digital data in a home environment of a multi-processor platform system in a digital home network as presented in FIGS. 1 and 2 are illustrated, in accordance with various embodiments. More specifically, FIG. 3 depicts the task related interactions associated with automatically performing a back-up between a host multi-processor platform 310 and at least one remote device 320 in the digital home network. In one embodiment, the backup program executes on the primary host processor 330 of the host platform 310 retrieving data from other computing platforms in the digital home network, such as remote devices 320. The backup application is configured in advance by the user and/or network server to ensure that the host platform 310 (processor and operating system) is running at a particular scheduled time, so that backup applications associated with the remote devices 320 can coordinate data exchange with the host platform 310 without user invention.

The multi-processor platform 310 includes a primary host processor 330, an embedded secondary processor 340, and persistent data storage 350. Data containing task information, such as back up policies and back up data as configured by the user may be stored in persistent storage on the host platform 310. In one embodiment, the backup application stores task information such as startup times and the logical location of data/drives in the home network to be backed up in persistent storage on the host platform 310.

In one embodiment, scheduling the task for automatically performing a back-up is initiated upon receipt by the primary host processor 330*a* of data and/or a document 331 containing desired settings to schedule back-up and related policies. Exemplary settings include desired start-up time, drive locations, and Wake-on-LAN (WoL) information for the device to be backed-up. A back up application or process 333 on the primary host processor stores the back-up data related to the task in non-volatile memory or persistent data storage 350 and/or other storage 355 so that the information associated with the task may be retrieved later as scheduled.

Once the task has been scheduled, the embedded secondary processor 340 of on the embedded partition operates one or more platform management components defining a predefined process 343 to check the persistent data store 350 for scheduled tasks. Upon identifying a scheduled task for the primary host processor, the embedded secondary processor 340 determines in query block 347 whether the host processor 330*b* needs to be woken up. If the circumstances do not require the embedded secondary processor 340 to activate the primary host processor 330*b*, the embedded partition may return to checking the data store for the next task. Alternatively, if the predetermined conditions are not satisfied to begin the task of automatically backing-up data, then the embedded secondary processor activates the primary host processor 330*b* to a proper state for performing the scheduled automated task.

In one embodiment, upon activation, the primary host processor 330*b* operates one or more components to begin a specified back-up process 335. Accordingly, policy process 337, one portion of the back-up application, retrieves and executes policies regarding systems to back-up. In one embodiment, the policy process 337 may retrieve back up policies for each system from policy storage 360. The policy process 337 will also ensure that the remote devices 320 to be backed up are already running by transmitting various Wake-on-LAN (WoL) messages from the platform 310 to the other remote devices 320 prior to attempting to backup the data. Once the remote devices 320 are active, the policy process 337 transmits the necessary task information to the remote device 320 as designated in the retrieved policy for back up. Upon receipt at the remote device 320, a client back up process 325 operating on the remote device 320 collects and delivers the requested data to be stored back to host platform 310.

A back up storage process 339, operating in one embodiment on the primary host processor, retrieves the back up data from the remote device 320. Upon receipt of the back up data, the back up storage process 339 stores the data retrieved from remote device 320 into a client specific back up location 370 on either the persistent data storage 350 and/or another storage (355, 375) of the at least one host platform 310 as identified by the task information. In one embodiment, the storage process 339 of the backup application will store all the distributed digital content retrieved from the remote devices 320 into centralized network attached storage (NAS), which could either be part of the host platform 310 or operate independent of the host platform 310.

Figure 4:
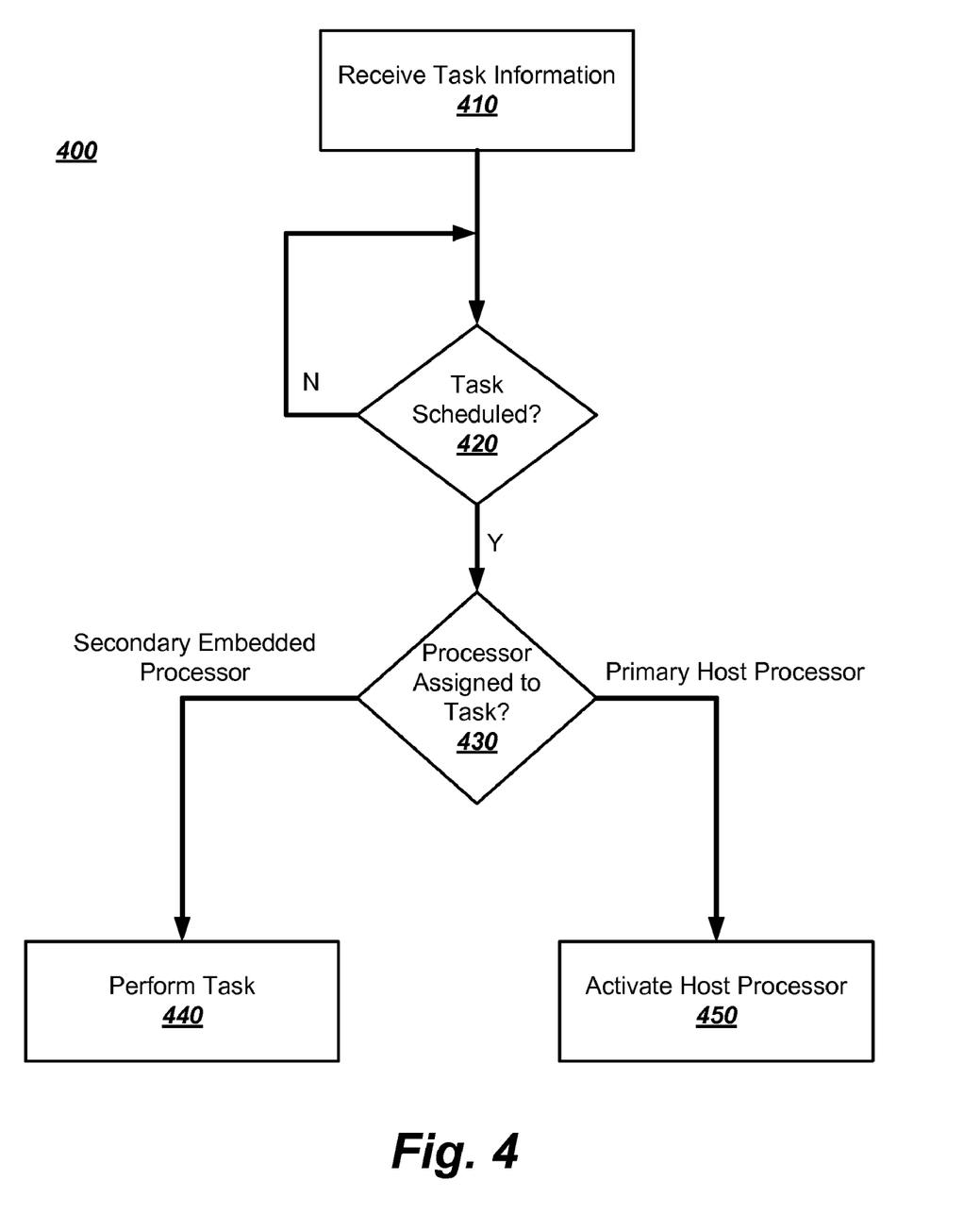
FIG. 4 illustrates a flow diagram view of a portion of the operations of a host device and different home network devices as presented in FIG. 1 in further detail, in accordance with various embodiments.
Figure 5:
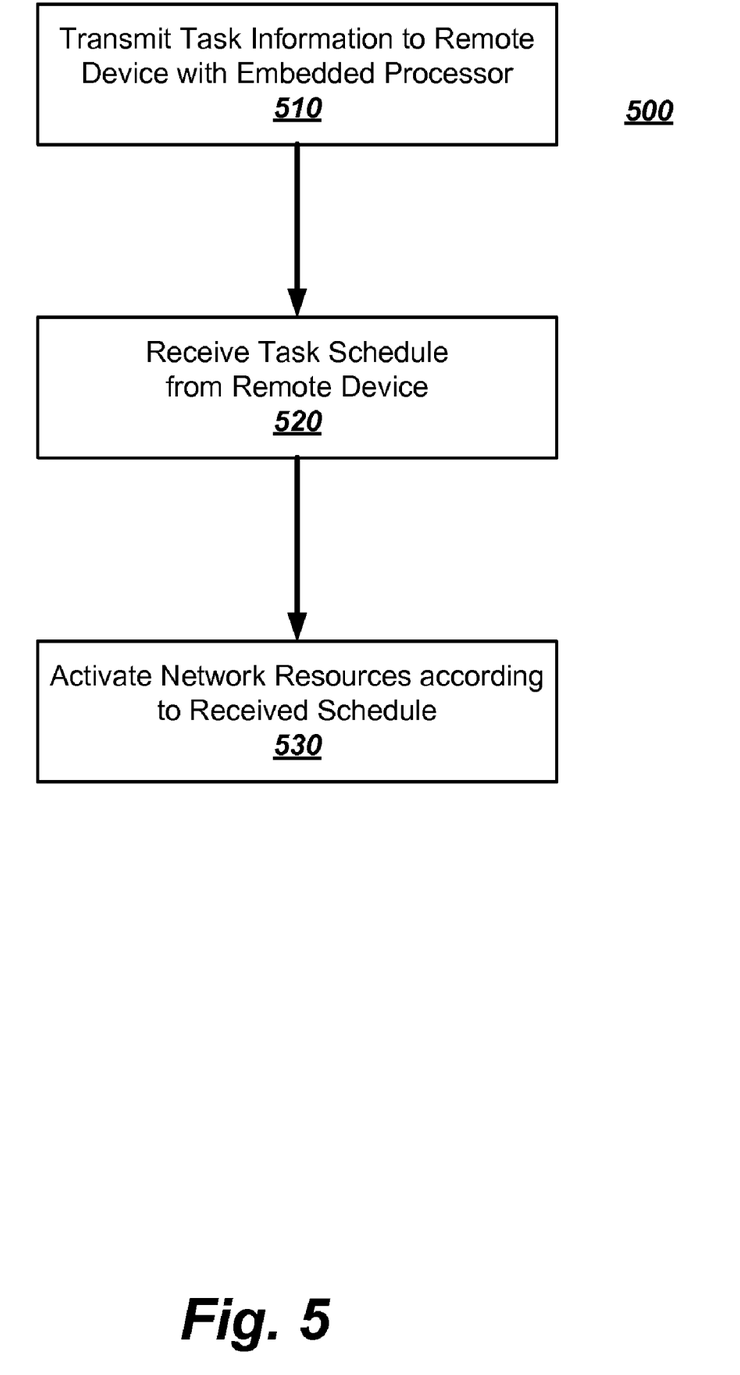
FIG. 5 illustrates a flow diagram view of a portion of the operations of a host device in a digital home network as presented in FIG. 2 in further detail, in accordance with various embodiments.
Figure 6:
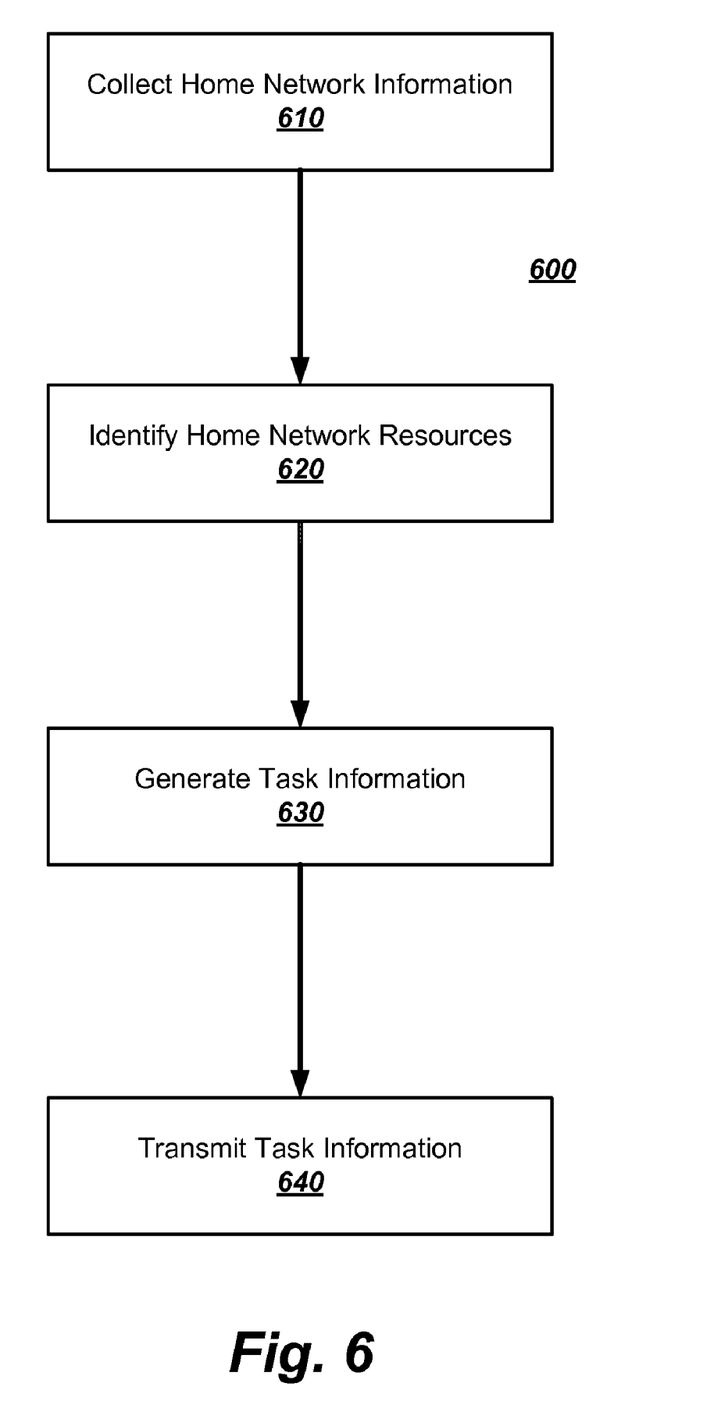
FIG. 6 illustrates a flow diagram view of a portion of the operations of a server device in a digital home network as presented in FIG. 1 in further detail, in accordance with various embodiments.

Turning now to FIGS. 4-6, methods, in accordance with various embodiments, are described in terms of computer firmware, software, and hardware with reference to a series of flow diagrams. In various embodiments, portions of the operations to be performed by a host platform device (e.g., FIGS. 4 and 5) and/or remote devices (FIG. 6) may constitute state machines or computer programs made up of computer-executable instructions. These instructions are typically maintained in a storage medium accessible by the host platform device and/or remote devices.

A machine-accessible medium or storage medium includes any mechanism that provides (i.e., stores and/or transmits) information in a form readable by a machine (e.g., a computer). For example, a storage medium includes read only memory (ROM), random access memory (RAM), magnetic disk storage media, optical storage media, flash memory devices, electrical, optical, acoustical or other form of propagated signals (e.g., carrier waves, infrared signals, digital signals), and the like.

Describing the methods by reference to a flow diagram enables one skilled in the art to develop such programs, including instructions to carry out the methods on suitably configured host platforms and/or remote devices. In various embodiments, at least one of the processors of a suitably configured host platform and/or remote device executes the instructions from the storage medium. In various embodiments, the computer-executable instructions may be written in a computer programming language or may be embodied in firmware logic, reconfigurable logic, a hardware description language, a state machine, an application-specific integrated circuit, or combinations thereof. If written in a programming language conforming to a recognized standard, such instructions may be executed on a variety of hardware platforms and may interface with a variety of operating systems.

The present various embodiments are not described with reference to any particular programming language. It will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a network device causes the processor of the computer to perform an action or a produce a result.

Referring to FIG. 4, a flow diagram of a portion of the operations of a host platform device 400 as presented in FIGS. 1 and 2 is shown in further detail, in accordance with various embodiments. The host platform device 400 receives task information in block 410. In one embodiment the task information is received by either the embedded secondary processor or a primary host processor of the device 400. The task information includes scheduling information associated with when the task is to be automatically performed and may also include identification information associated with locating where and how the task is to be performed. The device 400 determines whether the criteria associated with the task to be automatically performed without operator intervention have been satisfied in query block 420. Once the criteria have been satisfied, the device 400 determines whether the primary host processor or the secondary embedded processor should be used in query block 430. If the secondary embedded processor may be used, then the device 400 may automatically perform the task using the embedded secondary processor in block 440. Alternatively, if the primary host processor is required, the device 400 activates the necessary host processor and associated platform resources in block 450 ensuring that the host processor and platform resources may automatically perform the task.

Referring to FIG. 5, a flow diagram of a portion of the operations of a platform device 500 in a digital home network as presented in FIGS. 1-3 is shown in further detail, in accordance with various embodiments. The platform device 500 responsible for the task to be automatically performed transmits task information to other remote devices associated with the digital home network in block 510. In one embodiment, this information may include scheduling information from the platform device 500 associated with how, when, and who the task is going to be automatically performed. Upon receipt of the task information, the remote device may in various embodiments generate and transmit a task schedule indicating availability and preferences for scheduling.

The platform device 500 receives the task schedule in block 520 responsive to the transmitted task information. Once the received schedules from the various remote devices have been coordinated, the platform device 500 in one embodiment generates a composite schedule. Alternatively, the platform device 500 may not allow adjustments to the schedule by the remote devices.

In block 530 the platform device 500 activates the network resources associated with the respective task according to the received schedule. For example, if the task includes backing up data across the network, the network resources may include either the embedded secondary processor or a primary host processor of the remote device and/or remote storage resource media storage to store all the distributed digital content retrieved from the home network devices into centralized network attached storage (NAS).

As previously indicated, the described multi-processor platform for the home network may be configured to perform tasks automatically. These tasks may include operations on the platform itself or on remote device on the network. Although the remote devices need not include a multi-processor platform to participate in the task, certain tasks are performed in an enhanced manner when coordinated with other similarly configured platforms. For example, scanning for viruses may be performed using the main partition of a device, but additional viruses may be identified and avoided by using the embedded partition independent of the potentially infected operating system of a multi-processor platform.

Referring to FIG. 6, a flow diagram of a portion of the operations of a server 600 as presented in FIG. 1 is shown in further detail, in accordance with various embodiments. In block 610 the server 600 collects home network information regarding the attached remote devices. This network information may include among other things the number of multi-processor platforms available, the type of resources available, network configuration information, and the data stored on the various network devices.

Once the information is collected, the server 600 identifies the available home network resources in block 620 to determine which tasks may be available to the network. The server 600 generates task information for each available task based in part on the available home network resources in block 630. The task information is transmitted in block 640 to the various remote devices participating in the task.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. This application is intended to cover any adaptations or variations of the embodiment discussed herein. Therefore, it is manifested and intended that the invention be limited only by the claims and the equivalents thereof.

What is claimed is:
1. A method comprising:
  receiving, by an embedded partition of a device, from a host partition of the device, task scheduling information associated with a task scheduled to be executed by the host partition, the task scheduling information including a scheduled execution time;
  wherein the host partition is configured to execute a host operating system, and the embedded partition is configured to execute an embedded operating system regardless whether the host operating system is operating, and wherein the embedded partition is operatively coupled to the host partition via a network interface of the device;

determining, by the embedded partition, in view of the scheduled execution time, whether the host partition is in a power conservation state, and therefore incapable of executing the scheduled task as scheduled without exiting the power conservation state; and activating, based at least in part on a result of said determining, by the embedded partition, one or more components of the host partition to a sufficient power level to execute the scheduled task.

2. The method as recited in claim 1, wherein said activating one or more components includes activating one or more components associated with the task.

3. The method of claim 1, wherein the task includes interacting with another device coupled with the device through a network.

4. The method of claim 3, wherein the device includes a desktop computer, the other device includes an entertainment appliance, and the network includes a home network.

5. The method as recited in claim 3, wherein the task includes backing up data across the network.

6. The method as recited in claim 5, wherein the device is a desktop computer, the other device is a remote storage resource designated to receive backup information relating to the desktop computer, and the network is a home network.

7. The method as recited in claim 6, wherein the received task scheduling information includes at least one of desired start-up time, drive locations, and Wake-on-LAN (WoL) information for the other device.

8. The method as recited in claim 1, wherein said activating one or more components of the host partition comprises transmitting, via the network interface, a Wake-on-Lan (WoL) message to the host partition.

9. An apparatus comprising:

an input/output interface configured to be coupled to a networking interface of a device on which the apparatus is to be installed, the device including a host partition, coupled with the networking interface, and adapted to execute a host operating system;

a persistent storage area coupled to the input/output interface and configured to receive, from the host partition, task scheduling information associated with a task scheduled to be executed by the host partition, the task scheduling information including a scheduled execution time; and an embedded processor coupled to the input/output interface and the persistent storage and configured to operate an embedded operating system regardless whether the host operating system is operating, and to operate one or more platform management components configured to determine, in view of the scheduled execution time, whether the host partition is in a power conservation state, and therefore incapable of executing the scheduled task as scheduled without exiting the power conservation state, and activate, based at least in part on a result of said determine, one or more components of the host partition to a sufficient power level to execute the scheduled task.

10. The apparatus as recited in claim 9, wherein the task includes backing up data of the device.

11. The apparatus as recited in claim 9, wherein the one or more platform management components are further configured to activate the host partition to receive, via the network interface, from a remote device, the task scheduling information.

12. The apparatus as recited in claim 11, wherein the one or more platform management components are further configured to receive from the remote device via another networking interface, independent of the host partition, task scheduling information associated with a task to be executed by the apparatus.

13. The apparatus as recited in claim 9, wherein the host partition includes a host processor, and the host processor and the embedded processor are respectively assigned from a plurality of processing cores co-disposed in an integrated circuit package.

14. The apparatus as recited in claim 9, wherein the power conservation state includes a standby mode and a hibernation mode, and wherein said activate includes transmit a Wake-on-Lan (WoL) message to the host partition via the network interface.

15. A digital home system comprising:

a host partition including a network interface;

an embedded partition coupled to the host partition via the network interface, the embedded partition including a persistent memory;

wherein the host partition is configured to operate a host operating system and a plurality of programs configured to receive, via the network interface, from a remote device, task scheduling information associated with a task scheduled to be executed by the host partition, the task scheduling information including a scheduled execution time, and to store the received task scheduling information in the persistent memory of the embedded partition;

wherein the embedded partition is configured to operate an embedded operating system and one or more platform management components regardless whether the host operating system is operating, the one or more platform management components configured to identify the task scheduling information stored in the persistent memory, determine, in view of the scheduled execution time, whether the host partition is in a power conservation state, and therefore incapable of executing the scheduled task as scheduled, without exiting the power conservation state, and activate, based at least in part on a result of said determine, one or more components of the host partition associated with the task to a sufficient power level to execute the scheduled task.

16. The system as recited in claim 15, wherein the host partition is configured to enter the power conservation state when not actively used, and wherein said activate the one or more components of the host partition include transmit a Wake-on-Lan (WoL) message to the host partition via the network interface.

17. The system as recited in claim 16, wherein the power conservation state includes a standby state and a hibernation state.

18. The system as recited in claim 17, wherein said activate includes activate the host partition into a fully powered state.

19. The digital home system as recited in claim 15, wherein the task includes backing up data across a network.

20. An article of manufacture comprising:

a computer storage having stored therein a plurality of programming instructions that, upon execution, cause an embedded partition of a device to perform operations comprising:

receiving, from a host partition of the device, task scheduling information associated with a task scheduled to be executed by the host partition, the task scheduling information including a scheduled execution time, wherein the host partition is configured to execute a host operating system, and the embedded partition is configured to execute an embedded operating system regardless whether the host operating system is operating, and wherein the embedded partition is operatively coupled to the host partition via a network interface of the device;

determining, in view of the scheduled execution time, whether the host partition is in a power conservation state, and therefore incapable of executing the scheduled task as scheduled, without exiting the power conservation state; and activating, based at least in part on a result of said determining, one or more components of the host partition to a sufficient power level to execute the scheduled task.

21. The article of manufacture of claim 20, wherein the task includes backing up data across the network.

\* \* \* \* \*